United States Patent
Meilland

(10) Patent No.: US 8,219,853 B2
(45) Date of Patent: Jul. 10, 2012

(54) METHOD FOR LOCALIZING FAULTY HARDWARE COMPONENTS AND/OR SYSTEM ERRORS WITHIN A PRODUCTION PLANT

(75) Inventor: Gerald Meilland, Karlsruhe (DE)

(73) Assignee: Siemens Aktiengesellschaft, München (DE)

( * ) Notice: Subject to any disclaimer, the term of this patent is extended or adjusted under 35 U.S.C. 154(b) by 1091 days.

(21) Appl. No.: 12/152,574

(22) Filed: May 15, 2008

(65) Prior Publication Data

US 2008/0288911 A1    Nov. 20, 2008

(30) Foreign Application Priority Data

May 16, 2007    (EP) ..................................... 07009819

(51) Int. Cl.
*G06F 11/30*    (2006.01)
(52) U.S. Cl. ................... 714/25; 714/26; 714/4.2
(58) Field of Classification Search ....................... 714/25
See application file for complete search history.

(56) References Cited

U.S. PATENT DOCUMENTS

| | | | | |
|---|---|---|---|---|
| 3,623,011 A * | 11/1971 | Baynard et al. | ................. | 714/25 |
| 3,953,717 A * | 4/1976 | Rottier et al. | ................... | 714/46 |
| 4,514,846 A * | 4/1985 | Federico et al. | ................ | 714/45 |
| 4,517,154 A * | 5/1985 | Dennis et al. | .................. | 376/259 |
| 5,023,779 A * | 6/1991 | Federico et al. | ................ | 714/41 |
| 5,123,017 A * | 6/1992 | Simpkins et al. | ................ | 714/26 |
| 5,561,760 A * | 10/1996 | Ferris et al. | ...................... | 714/25 |
| 6,330,482 B1 | 12/2001 | McCain et al. | | |
| 6,370,659 B1 * | 4/2002 | Maney | ............................ | 714/25 |
| 7,882,394 B2 * | 2/2011 | Hosek et al. | .................... | 714/26 |
| 2001/0047216 A1 * | 11/2001 | Ando | ............................. | 700/109 |
| 2003/0061007 A1 * | 3/2003 | Sigl | ................................ | 702/185 |
| 2003/0070114 A1 * | 4/2003 | Yasuda | ............................ | 714/20 |
| 2003/0158615 A1 * | 8/2003 | Weber et al. | ..................... | 700/96 |
| 2003/0217256 A1 * | 11/2003 | Gilstrap et al. | ............... | 713/100 |
| 2004/0003318 A1 * | 1/2004 | Felke et al. | ..................... | 714/25 |
| 2004/0177124 A1 * | 9/2004 | Hansen | ......................... | 709/206 |
| 2005/0091642 A1 * | 4/2005 | Miller | ........................... | 717/124 |
| 2006/0101402 A1 * | 5/2006 | Miller et al. | .................. | 717/124 |
| 2006/0161819 A1 * | 7/2006 | Nissan-Messing et al. | .... | 714/48 |
| 2007/0239373 A1 * | 10/2007 | Nasle | .............................. | 702/58 |
| 2007/0258380 A1 * | 11/2007 | Chamdani et al. | ............ | 370/252 |
| 2008/0034077 A1 * | 2/2008 | Takashige et al. | ............ | 709/223 |
| 2008/0256149 A1 * | 10/2008 | Bansal et al. | .................. | 707/206 |

FOREIGN PATENT DOCUMENTS

EP    1 672 452 A1    6/2006

\* cited by examiner

*Primary Examiner* — Scott Baderman
*Assistant Examiner* — Chae Ko

(57) ABSTRACT

There is described a method for localizing faulty hardware components and/or system errors within a production plant comprising several hardware components, with the production plant and the individual hardware components thereof being managed and/or configured by means of automation software and with the production plant being visualized and/or controlled by means of HMI software. Provision is made for identification data of the hardware components and/or groups of hardware components to be detected by the automation software and for information relating to the site to be assigned to the individual hardware components and/or groups of hardware components by means of the automation software and/or HMI software on the basis of identification data such that in the event of error messages as a result of faulty hardware components or in the event of system errors, a localization of the affected hardware component and/or group of hardware components is enabled within the production plant.

16 Claims, No Drawings

METHOD FOR LOCALIZING FAULTY HARDWARE COMPONENTS AND/OR SYSTEM ERRORS WITHIN A PRODUCTION PLANT

CROSS REFERENCE TO RELATED APPLICATIONS

This application claims priority of European Patent Office application No. 07009819.9 EP filed May 16, 2007, which is incorporated by reference herein in its entirety.

FIELD OF INVENTION

The invention relates to a method for localizing faulty hardware components and/or system errors within a production plant comprising several hardware components, with the production plant and the individual hardware components thereof being managed and/or configured by means of automation software and with the production plant being visualized and/or controlled by means of HMI software, in accordance with the preamble of claim 1.

BACKGROUND OF INVENTION

It is known that production plants are configured with the aid of automation software. Here the individual hardware components of the production plant are detected and the necessary information is input partially automatically and partially by means of user inputs. The addresses of hardware components within racks and the addresses of hardware components within a network, the order reference of the hardware components (MLFB), belong in particular to these items of information. Each hardware component also has an operating means identifier (BMKZ), which consists of freely definable parts, such as in particular plant identifier (AKZ), location designation (OKZ) and type/sequence number/function (AZF). The operating means identifier is defined by the respective user.

The automation software STEP 7/HW-Konfig by Siemens is used to configure plants of this type for instance.

This software provides for a presetting in respect of exposure to system errors, in particular in respect of exposure to alarms, which are to be displayed on a display device (for instance by means of a human machine interface (HMI).

The WinCC software by Siemens can be used as a suitable HMI system for instance, and is also suited to controlling production plants by way of a PLC (for instance Siemens SIMATIC).

The user configures the handling of system errors and in particular the alarms, which are to be displayed by means of the HMI, by means of the automation software. The user also configures the site of the production plant with buildings, rooms and other details by means of the HMI system.

In the event of a system error, an alarm is transmitted to the HMI system by means of automation software. There the previously determined information is shown to the user, for instance the name of the component. A localization of the system error in respect of the site of the component is however not carried out.

SUMMARY OF INVENTION

Based on this, an object underlying the invention is to further develop known methods of the type mentioned in the introduction.

In order to achieve this object, an inventive method has the features of claim 1. Preferred developments of the invention incidentally result from the subclaims and from the description.

The invention is characterized according to an independent claim. Identification data of the hardware components and/or groups of hardware components is detected by the automation software and information relating to the site is assigned to the individual hardware components and/or groups of hardware components by means of automation software and/or the HMI software on the basis of identification data such that in the event of error messages as a result of faulty hardware components and/or in the event of system errors, a localization of the affected hardware component and/or group of hardware components within the production plant is enabled.

This solution is advantageous in that it is significantly easier for the user to identify the hardware component and/or group of hardware components within the production plant which are affected by the system error.

Provision is preferably made for the site of the affected hardware component and/or group of hardware components within the production plant to be indicated by means of the HMI program.

The identification data can be detected for instance by reading out I&M data of the hardware components by means of automation software, with the automation software preferably reading out the serial numbers of all hardware components of the production plant and storing these together with the remaining data of the hardware components (order reference (MLFB), operating means identifier (BMKZ), plant identifier (AKZ), location designation (OKZ) and type/sequence number/function (AZF)).

In a preferred embodiment of the invention, provision is made for the identification data of the hardware components to be unambiguous serial numbers of the same.

According to a preferred development of the invention, provision is made for the assignment of hardware components to a site to be carried out in the HMI software by means of linking a hardware component or a group of hardware components in the automation software to a corresponding control.

Provision is preferably made for a distinction to be made between at least two types of hardware component during the assignment of hardware components to a site.

On the one hand, hardware components which can be assigned to a container can exist, in other words a module to its rack for instance. Hardware components which are connected to an additional hardware component also fall within the same category, in other words a cable to its module for instance.

So-called superordinate hardware components, which are not assigned to any container, also exist, such as for instance racks, ProfiBus slaves and PNIO stations.

As the first type of hardware components are physically arranged at the same site as their containers, provision can be made in accordance with the invention for hardware components, which belong to a group of hardware components at the same site, to adopt the allocation of the site of the group for all hardware components assigned to the group. This can also take place automatically.

On the other hand, not only is a reference to a corresponding control of the HMI software stored within the automation software, but also a reference to the hardware component within the automation software is stored within the HMI software for the so-called superordinate hardware components.

The assignment in STEP7 can take place as a reference to the corresponding control within the WinCC image, namely as a characteristic of the hardware component. By contrast, a reference to the hardware component can be stored in the WinCC as an attribute of the corresponding control.

The assignment of a hardware component to a site can be possible both on the part of the automation software as well as on the part of the HMI software. To this end, both programs are to offer corresponding functions. The selection of a control within the automation software or the selection of a hardware component within the HMI software is preferably sufficient to determine the assignment. After selecting a superordinate hardware component in the automation software, the required function can offer a list of the configured controls in the HMI software, from which the user selects the corresponding control. It is also possible for the list of superordinate hardware components to be provided for selection purposes following selection of a control in the HMI software. After the assignment, all configured controls can then be stored in the HMI software by way of their serial numbers.

A further special characteristic can then consist in the new identification data of the new hardware component being assigned to the previous identification data during the exchange of a hardware component such that during the exchange of the hardware component, the assignment of the new hardware component to the site within the production plant is retained. This function can proceed automatically, since the removal and/or adding of hardware components is detected by means of the system diagnosis.

With the inventive solution, an alarm is transmitted to the HMI software in the event of a system error. As the system diagnosis has an assignment of the current serial number to the original serial number, the originally configured serial number only has to be transferred to the HMI software in order to allow an assignment of the alarm to the corresponding control and thus to the site within the production plant.

To summarize, the advantages of the invention consist in the user being able to use the plant images stored in the HMI software in a significantly easier fashion in order to localize the site of a system error. In addition, an automated assignment of the site is to some extent possible. The exchange of a component does not result in a loss of the connection between the hardware component and the plant image. A further advantage consists in the assignment herewith provided in a simple manner between a diagnosis viewer (automatically created topological view of the project), the system errors illustrated there and the plant view in the HMI software.

The invention claimed is:

1. A method for localizing faulty hardware components or system errors within a production plant comprising several hardware components, comprising:
   providing a production plant with hardware components managed or configured by an automation software, wherein the production plant is visualized or controlled with a human machine interface software;
   detecting identification data of the hardware components or groups of hardware components with the automation software; and
   assigning information relating to a site to individual hardware components or groups of hardware components by the automation software or human machine interface software
   based upon the identification data of the hardware components or groups of hardware components such that, in events of error messages as a result of faulty hardware components or system errors, a localization of the faulty hardware components is enabled within the production plant,
   wherein
   a reference to a control of the human machine interface software is stored within the automation software for superordinate hardware components, and
   a reference to the superordinate hardware components within the automation software is stored within the human machine interface software.

2. The method as claimed in claim 1, wherein the site of the faulty hardware component within the production plant is indicated via the human machine interface software.

3. The method as claimed in claim 1, wherein the identification data of the hardware components are serial numbers of the hardware components.

4. The method as claimed in claim 2, wherein the identification data of the hardware components are serial numbers of the hardware components.

5. The method as claimed in claim 1, wherein an assignment of hardware components to the site is based upon linking a hardware component or a group of hardware components in the automation software to a corresponding control via the human machine interface software.

6. The method as claimed in claim 2, wherein an assignment of hardware components to the site is based upon linking a hardware component or a group of hardware components in the automation software to a corresponding control via the human machine interface software.

7. The method as claimed in claim 3, wherein an assignment of hardware components to the site is based upon linking a hardware component or a group of hardware components in the automation software to a corresponding control via the human machine interface software.

8. The method as claimed in claim 4, wherein an assignment of hardware components to the site is based upon linking a hardware component or a group of hardware components in the automation software to a corresponding control via the human machine interface software.

9. The method as claimed in claim 1, wherein, when hardware components belong to a group of hardware components at the same site, the allocation of the site of the group is adopted for all hardware components assigned to the group.

10. The method as claimed in claim 2, wherein, when hardware components belong to a group of hardware components at the same site, the allocation of the site of the group is adopted for all hardware components assigned to the group.

11. The method as claimed in claim 3, wherein, when hardware components belong to a group of hardware components at the same site, the allocation of the site of the group is adopted for all hardware components assigned to the group.

12. The method as claimed in claim 4, wherein, when hardware components belong to a group of hardware components at the same site, the allocation of the site of the group is adopted for all hardware components assigned to the group.

13. The method as claimed in claim 1, wherein, when hardware components belong to a group of hardware components at the same site, the allocation of the site of the group is adopted for all hardware components assigned to the group.

14. The method as claimed in claim 9, wherein the allocation of sites of individual hardware components is automatically carried out following the allocation of the site of the group.

15. The method as claimed in claim 1, wherein, in the event of an exchange of a hardware component, a new identification of a new hardware components is assigned to the previous identification data of the hardware component to be exchanged.

16. The method as claimed in claim 1, wherein, in the event of an exchange of a hardware component, a new identification of a new hardware components is assigned to previous identification data of the hardware component to be exchanged.

* * * * *